United States Patent [19]

McPherson et al.

[11] 4,125,824

[45] Nov. 14, 1978

[54] ALARM CIRCUIT

[75] Inventors: Ernest W. McPherson; Jonn C. Barss, both of Dartmouth, Canada

[73] Assignee: Barmac Electronics, Dartmouth, Canada

[21] Appl. No.: 684,089

[22] Filed: May 7, 1976

[30] Foreign Application Priority Data

May 20, 1975 [CA] Canada ................................ 227381

[51] Int. Cl.² ...................... B60Q 11/00; G08B 23/00

[52] U.S. Cl. .............................. 340/52 D; 307/10 R; 315/80; 340/52 F

[58] Field of Search ................ 340/52 D, 52 E, 52 F, 340/98, 213 R, 213 Q, 248 R, 253 R, 420, 421; 315/77, 80, 82, 84; 307/10 R, 243, 115

[56] References Cited

U.S. PATENT DOCUMENTS

| | | | |
|---|---|---|---|
| 3,662,334 | 5/1972 | Susslin | 340/52 D |
| 3,899,770 | 8/1975 | Slotkowski | 340/52 F |
| 4,029,991 | 6/1977 | Schultz | 315/135 |

*Primary Examiner*—John W. Caldwell, Sr.
*Assistant Examiner*—Joseph E. Nowicki

[57] ABSTRACT

An alarm circuit for vehicle headlights including a switching circuit which provides a warning when the headlights should be activated in accordance with ambient conditions, such as low light levels, as well as warning of when the headlights should be de-activated, as when the vehicle ignition system is switched off.

5 Claims, 2 Drawing Figures

ALARM CIRCUIT

This invention relates to an alarm circuit for indicating changes in ambient conditions—such as light level—in accordance with the selected operating mode of a machine relative to such conditions.

A particular environment to which the present invention is especially suited is that of the automobile. In an automobile, various accessories may be selectively operated in accordance with prevailing conditions—such as windshield wipers for rain or snow, headlights for low light levels, etc. Many of these accessories are only operable when the automobile ignition is switched on, but others do not automatically turn off when the ignition is turned off, such as, for example, the headlights. It is, perhaps, the most common single cause of battery failures in automobiles that the headlights are inadvertently left burning when the vehicle is parked, thus imposing a severe drain on the battery. Another problem is that many drivers find the ambient light level at dusk or dawn difficult to judge and, therefore, do not energize the vehicle headlights at the proper time. Statistically, many accidents occur during these periods as a result of the poor light conditions and failure of the driver or drivers involved to use their vehicle headlights. Another common problem is that of a driver entering a car at night and forgetting to switch on the headlights before operating the vehicle.

It is therefore an object of the present invention to provide an alarm circuit which will provide warning of when a particular operating function—such as vehicle headlights—should be activated in accordance with ambient conditions, as well as providing warning of when such function should be de-activated due to a change in other operating conditions—such as switching off of the vehicle ignition system.

Thus, according to the present invention there is provided an alarm circuit comprising a first terminal means adapted for connection to a supply potential source, an alarm means capable of being energized by said supply potential and connected between said first terminal means and a reference ground potential point through first and second series-connected switching means; third and fourth series-connected switching means connected between said first terminal means and a reference ground potential point; each of said first, second, third and fourth switching means having a control electrode for selectively enabling or disabling said switching means in accordance with the potential at the respective control electrode; said control electrode of said first switching means further being connected through a series-connected first unidirectional current passing means and a sensing circuit to second terminal means and, the control electrode of said first switching means being connected through second unidirectional current passing means to third terminal means, whereby said first switching means closes in response to potential from said third terminal means and said sensing circuit, said first and second unidirectional current passing means isolating said second and third terminal means from one another whilst providing current paths therethrough from said second and third terminal means respectively to said control electrode of said first switching means, and the control electrodes of said second, third and fourth switching means being connected to said first, third and second terminal means, respectively, whereby said third and fourth switching means close in response to potential from both of said second and third terminal means and thereby cause said second switching means to open, and said second switching means is closed when at least one of said third and fourth switching means is open.

In a preferred embodiment of the invention, each of switching means is a transistor, which is of the appropriate polarity type, depending upon the polarity of the supply potential for the circuit.

As hereinbefore stated, the circuit is of special use as an automobile headlight warning system, wherein said second and third terminal means are respectively connected to the output side of the automobile ignition and headlight switches. Said first terminal means is connected to the ignition system of the automobile, so that when ignition switch is ON and the headlights switch is OFF, the alarm would be energized if the ambient light, as detected by the sensing circuit, is below a certain level. Also, if the headlights switch is ON and the ignition switch is turned OFF, the alarm will again be energized.

The invention will be more readily understood from the following description of an embodiment thereof given by way of example only and with reference to the accompanying drawings, wherein.

Figure 1:
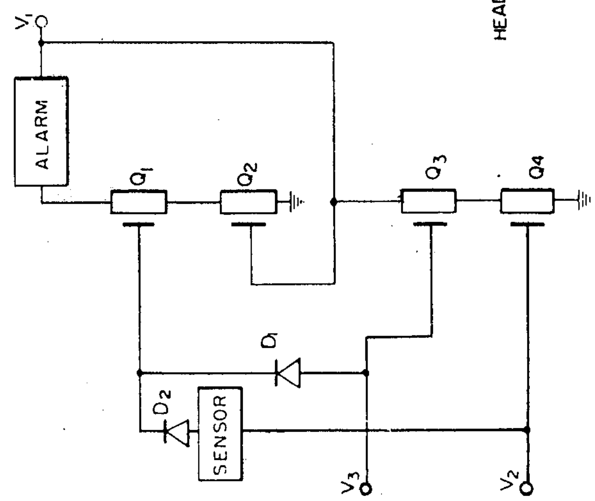
FIG. 1 is a block-diagram of an alarm circuit.

Referring to FIG. 1, the novel circuit comprises first and second switching means $Q_1$ and $Q_2$ serially connected with an alarm between a voltage supply terminal $V_1$ and a reference ground potential point. Each of switches $Q_1$ and $Q_2$ has a control element which causes the switch to conduct upon the application of a suitable bias potential thereto. The control element for switching means $Q_1$ is connected through a sensor circuit and a unidirectional current passing means $D_2$ to a second voltage supply terminal $V_2$, and is also connected to a third voltage supply terminal $V_3$ through a unidirectional current passing means $D_1$.

The control element for switching means $Q_2$ is connected to voltage supply terminal $V_1$ and is also connected to reference ground potential through serially connected switching means $Q_3$ and $Q_4$, each of which is also provided with a control element. The control element of $Q_3$ is connected to terminal $V_3$ and the control element of $Q_4$ is connected to terminal $V_2$.

The circuit operation is as follows. For the alarm to be energized, there must be a current path through the alarm and through switches $Q_1$ and $Q_2$, between voltage supply terminal $V_1$ and reference ground potential. Therefore, both switches $Q_1$ and $Q_2$ require a bias potential appearing at the control elements thereof to maintain the switches in conducting state. Considering firstly the conditions under which switch means $Q_2$ is conducting, the necessary bias voltage will be derived from terminal $V_1$, unless current is bled to ground through $Q_3$ and $Q_4$. For the latter situation to occur, both $Q_3$ and $Q_4$ must be conducting, which requires a bias voltage to be applied to each switch from the respective terminals $V_3$ and $V_2$. In this case, current would flow through $Q_3$ and $Q_4$, and $Q_2$ would not conduct, thereby preventing energization of the alarm.

Considering the necessary conditions for $Q_1$ to conduct, the required bias potential may be derived either from terminal $V_3$ (directly) or from terminal $V_2$ (through the sensor circuit). If a bias potential appears at $V_3$, then $Q_1$ is caused to conduct, regardless of the condition of the sensor circuit or the potential of terminal $V_2$. If no bias potential appears at $V_3$, then $Q_1$ can only conduct if a bias potential is derived from terminal $V_2$, through the sensor circuit.

The foregoing may thus be summarized as follows:

If both $V_2$ and $V_3$ are at bias potential, both $Q_3$ and $Q_4$ will conduct, which causes $Q_2$ to block. The alarm is then "off".

If neither $V_2$ and $V_3$ are at bias potential, $Q_2$ is caused to conduct since the control element thereof is at the potential source for $Q_1$ and, thus, the alarm is again "off".

If only $V_3$ is at bias potential, then $Q_1$ and $Q_3$ conduct. $Q_4$ remains non-conducting since $V_2$ is not at bias potential, and $Q_2$ is therefore biased into conductance by the potential of $V_1$. Thus, both $Q_1$ and $Q_2$ conduct and the alarm is energized.

If only $V_2$ is at bias potential, then $Q_3$ remains non-conducting, which permits the bias potential of $V_1$ to appear at the control element of $Q_2$. If the conditions are appropriate for the sensor circuit to be completed, then the bias potential of $V_2$ is applied to the control element of $Q_1$. It may be noted that diode $D_1$ prevents the control element of $Q_3$ or the terminal $V_3$ from assuming the potential of terminal $V_2$. Therefore, both $Q_1$ and $Q_2$ conduct, which energizes the alarm. However, if the conditions are such that the sensor circuit is not complete, then the bias potential of $V_2$ is not applied to the control element of $Q_1$, and $Q_1$ remains non-conducting. In this condition, the alarm is "off".

Consider the situation where $V_2$ and $V_3$ are interconnected with the ignition and light switches, respectively, of an automobile, and the sensor circuit is completed upon detection of ambient light level below a certain predetermined value. Thus, when the ignition switch is "on" and the light switch is "off", a bias potential appears at $V_2$, but not at $V_3$. It will now be apparent from a consideration of the foregoing discussion that in such a situation, the potential of $V_2$ (i.e. the ignition switch) appears at the control element of $Q_1$ only when the ambient light level drops below the predetermined level for which the sensor is set, and the alarm is then energized.

Conversely, when the light switch is "on" and the ignition switch is "off", $Q_1$ is caused to conduct, regardless of the condition of the sensor circuit, thus energizing the alarm and giving warning that the lights have been left on after the ignition has been switched off.

Figure 2:
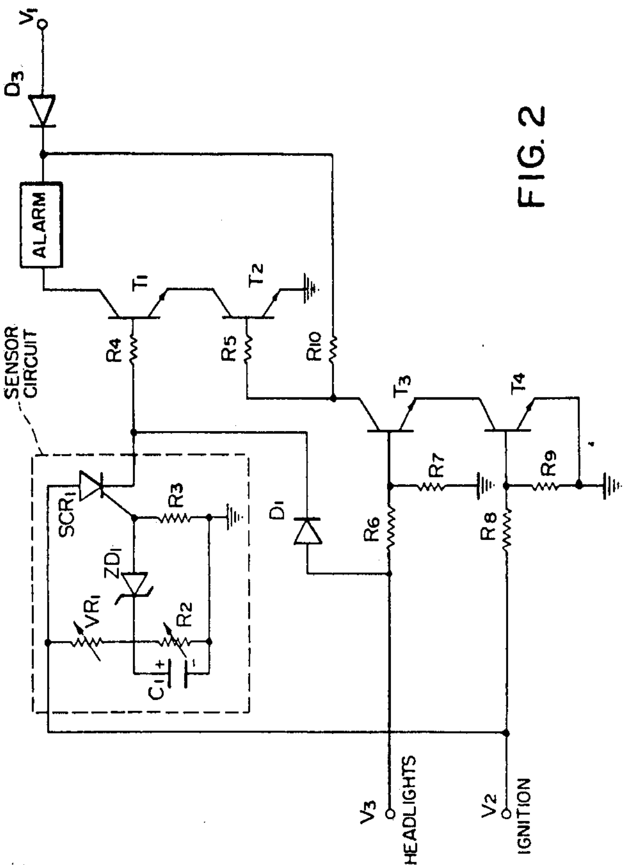
FIG. 2 is a schematic circuit diagram of one embodiment of the alarm circuit illustrated in FIG. 1.

Referring now to FIG. 2, a preferred embodiment of the invention is illustrated, wherein switching means $Q_1$ to $Q_4$ inclusive are bipolar transistors (now designated $T_1$ to $T_4$, respectively). Since the electrical systems of almost all modern automobiles are negative ground, NPN transistors are employed throughout. Again, terminal $V_1$ is maintained at a steady potential (normally 12 volts in a modern automobile) and terminals $V_2$ and $V_3$ are connected to the switched sides of the ignition and headlight switches respectively.

The sensor circuit comprises a capacitor $C_1$ connected through a zener diode $ZD_1$ to the gate of a silicon controlled rectifier $SCR_1$. In this case, $SCR_1$ also constitutes the unidirectional current passing means $D_2$ of FIG. 1. A photo-resistor $R_2$ is connected across capacitor $C_1$, and the negative plate of $C_1$ is connected to ground. The gate of $SCR_1$ is also connected to ground through a resistor $R_3$. The positive plate of capacitor $C_1$ is connected through a variable resistor $VR_1$ to the anode of $SCR_1$, the junction between $SCR_1$ and $VR_1$ being connected to terminal $V_2$.

The cathode of $SCR_1$ is connected through a diode $D_1$ to terminal $V_3$ and is also connected through a resistor $R_4$ to the base of transistor $T_1$.

The base of transistor $T_2$ is connected to the collector of transistor $T_3$ through a resistor $R_5$, and the base of $T_3$ is connected through a resistor $R_6$ to the junction of diode $D_1$ and terminal $V_3$. The base of $T_3$ is also connected through a resistor $R_7$ to ground.

The base of transistor $T_4$ is connected through a resistor $R_8$ to terminal $V_2$ and is also connected through a resistor $R_9$ to ground. The emitter of $T_4$ is connected directly to ground.

A diode $D_3$ is connected between the terminal $V_1$ and the alarm, such diode protecting the circuit against polarity reversal of the operating potential at $V_1$. The cathode of diode $D_3$ is connected through a resistor $R_{10}$ to the collector of $T_3$.

The alarm is connected to the collector of $T_1$; the emitter of $T_1$ is connected to the collector of $T_2$; the emitter of $T_3$ is connected to the collector of $T_4$; and the emitter of $T_2$ is connected to ground.

The operation of the circuit will now be described with reference to the following conditions:

*Ignition OFF, Headlights ON*

Transistor $T_1$ is enabled by the bias potential derived through $D_1$ and $R_4$ from terminal $V_3$. Transistor $T_3$ is also enabled by the bias potential derived from terminal $V_3$ through resistors $R_6$ and $R_7$. The potential at $V_3$ is, of course, the 12 volts supply for the headlight system.

Transistor $T_4$ is disabled, since there is no bias potential supply from terminal $V_2$, and transistor $T_2$ is therefore enabled by a bias potential derived from terminal $V_1$ through $R_{10}$ and $R_5$. With both $T_1$ and $T_2$ enabled, the current path through the alarm to ground is completed and the alarm is energized.

As soon as the headlights are turned OFF, the bias potential at terminal $V_3$ is removed, thus disabling transistor $T_1$ and interrupting the current path from the alarm to ground. Therefore, the alarm is de-energized.

*Ignition ON, Headlights OFF*

Terminal $V_2$ is now at the 12-volt supply potential and $T_4$ is therefore enabled. With the headlight switch in the OFF position, there is no bias potential at $V_3$, and $T_3$ is consequently disabled. Therefore, there is no potential drop across $R_{10}$ and $T_2$ is enabled through $R_{10}$ and $R_5$.

The condition of the alarm is now entirely dependent upon the state of transistor $T_1$. Provided the ambient light level is above a predetermined value (which is set by adjustment of variable resistor $VR_1$), the resistance of $R_2$ is sufficiently low that the voltage appearing at the cathode of zener diode $ZD_1$ is below the breakdown voltage of $ZD_1$. There is no voltage drop across resistor $R_3$ to ground and, consequently, no enabling potential at the gate of $SCR_1$. Thus, $SCR_1$ does not conduct, and transistor $T_1$ remains disabled.

If, however, the ambient light level drops below the predetermined value, the resistance of $R_2$ increases to a point where the voltage appearing at the cathode of $ZD_1$ exceeds the breakdown voltage thereof and $ZD_1$ conducts. A voltage drop now occurs across $R_3$ and an enabling potential appears at the gate of $SCR_1$. Since $SCR_1$ is now conducting, an enabling potential appears at the base of $T_1$ through $SCR_1$ and resistor $R_4$, and both $T_1$ and $T_2$ are enabled. In this condition, the alarm is energized.

In the foregoing discussion, the role of capacitor $C_1$ has been ignored for the sake of simplicity. The function of $C_1$ is to introduce a time factor into the sensor circuit, whereby the alarm will not be energized by transient drops in light level such as may be caused by overpasses and the like. Thus, as the light level drops and the resistance of $R_2$ increases, capacitor $C_1$ charges correspondingly. Providing the light level remains low, sufficient charge will be developed on capacitor $C_1$ to effect a breakdown of $ZD_1$ and consequent enabling of $SCR_1$. However, if the light level drops are transitory, the charge developed on $C_1$ will be insufficient to provide a breakdown voltage for $ZD_1$ and $SCR_1$ remains disabled.

The component values and transistor types, etc. are chosen in accordance with the precise operating parameters of the circuit, including the operating voltage level and polarity. The transistors illustrated are bipolar NPN types, but in the case of positive-ground systems would be PNP types. Also, by appropriate circuit modifications, which may be readily determined by those skilled in the art, the bipolar transistors may be replaced by field-effect transistors or, indeed, any other suitable type of switching means.

The alarm may be a bell, a visual warning, a buzzer, or a combination of warning devices. The sensor portion of the device is by no means limited to a light-level sensor circuit, as exemplified herein, but may be responsive to other conditions of which it is desired to provide warning.

Thus, it is believed to be apparent that the present invention has a wide variety of applications and may exist in many alternative embodiments to those described above without departing from the spirit and scope of the invention as described and claimed herein.

The embodiments of the invention in which an exclusive property or privilege is claimed are defined as follows:

1. An alarm circuit comprising a first terminal means adapted for connection to a supply potential source, an alarm means capable of being energized by said supply potential and connected between said first terminal means and a reference ground potential point through first and second series-connected switching means; third and fourth series-connected switching means connected between said first terminal means and a reference ground potential point; each of said first, second, third and fourth switching means having a control electrode for selectively enabling or disabling said switching means in accordance with the potential at the respective control electrode; said control electrode of said first switching means further being connected through a series-connected first unidirectional current passing means and a sensing circuit to second terminal means and, the control electrode of said first switching means being connected through second unidirectional current passing means to third terminal means, whereby said first switching means closes in response to potential from said third terminal means and said sensing circuit, said first and second unidirectional current passing means isolating said second and third terminal means from one another whilst providing current paths therethrough from said second and third terminal means respectively to said control electrode of said first switching means; and the control electrodes of said second, third and fourth switching means being connected to said first, third and second terminal means, respectively, whereby said third and fourth switching means close in response to potential from both of said second and third terminal means and thereby cause said second switching means to open, and said second switching means is closed when at least one of said third and fourth switching means is open.

2. An alarm circuit as claimed in claim 1, wherein said first, second, third and fourth switching means each comprise first, second, third and fourth transistors, respectively, having base, collector and emitter, and said control electrodes comprise the bases of said respective transistors, said first transistor having its collector connected through said alarm means to said first terminal means, and its emitter connected to the collector of said second transistor, the latter having its emitter grounded, the base of said second transistor being connected to the collector of said third transistor, and the emitter of said third transistor being connected to the collector of said fourth transistor, the emitter of which is grounded.

3. An alarm circuit as claimed in claim 2, wherein the bases of said third and fourth transistors are returned to ground through biasing resistors.

4. An alarm circuit as claimed in claim 1, wherein said sensing circuit comprises a photosensitive element controlling the application of potential from said second terminal means to said control electrode of said first switching means.

5. An alarm circuit as claimed in claim 1, wherein said sensing circuit comprises a photoresistor controlling the application of potential from said second terminal means to said control electrode of said first switching means.

* * * * *